(12) United States Patent
Strain

(10) Patent No.: US 10,312,539 B1
(45) Date of Patent: Jun. 4, 2019

(54) SYSTEM AND METHOD FOR STORAGE AND RETRIEVAL OF ENERGY

(71) Applicant: David Joseph Strain, Saint Peters, MO (US)

(72) Inventor: David Joseph Strain, Saint Peters, MO (US)

(*) Notice: Subject to any disclaimer, the term of this patent is extended or adjusted under 35 U.S.C. 154(b) by 0 days.

(21) Appl. No.: 15/636,284

(22) Filed: Jun. 28, 2017

(51) Int. Cl.
| | |
|---|---|
| *H01M 8/00* | (2016.01) |
| *H01M 8/0656* | (2016.01) |
| *C25B 1/04* | (2006.01) |
| *H01M 8/04089* | (2016.01) |
| *H01M 8/04082* | (2016.01) |

(52) U.S. Cl.
CPC .............. *H01M 8/0656* (2013.01); *C25B 1/04* (2013.01); *H01M 8/04089* (2013.01); *H01M 8/04201* (2013.01)

(58) Field of Classification Search
CPC combination set(s) only.
See application file for complete search history.

(56) References Cited

U.S. PATENT DOCUMENTS 5,346,778 A * 9/1994 Ewan .................. B60L 11/1881
204/DIG. 4

* cited by examiner

*Primary Examiner* — Jacob B Marks
(74) *Attorney, Agent, or Firm* — R. Scott Kimsey, Esq.; Klein, DeNatale, Goldner, LLP

(57) ABSTRACT

A system and method for storage and retrieval of energy includes storage of energy by performing electrolysis of water and directing the resulting hydrogen gas and oxygen gas to respective storage tanks. Energy is retrieved by directing hydrogen gas and oxygen gas from the storage tanks to a fuel cell where the hydrogen and oxygen are reacted to produce electricity and water. Water from the fuel cell is directed to a reservoir for subsequent electrolysis.

7 Claims, 1 Drawing Sheet

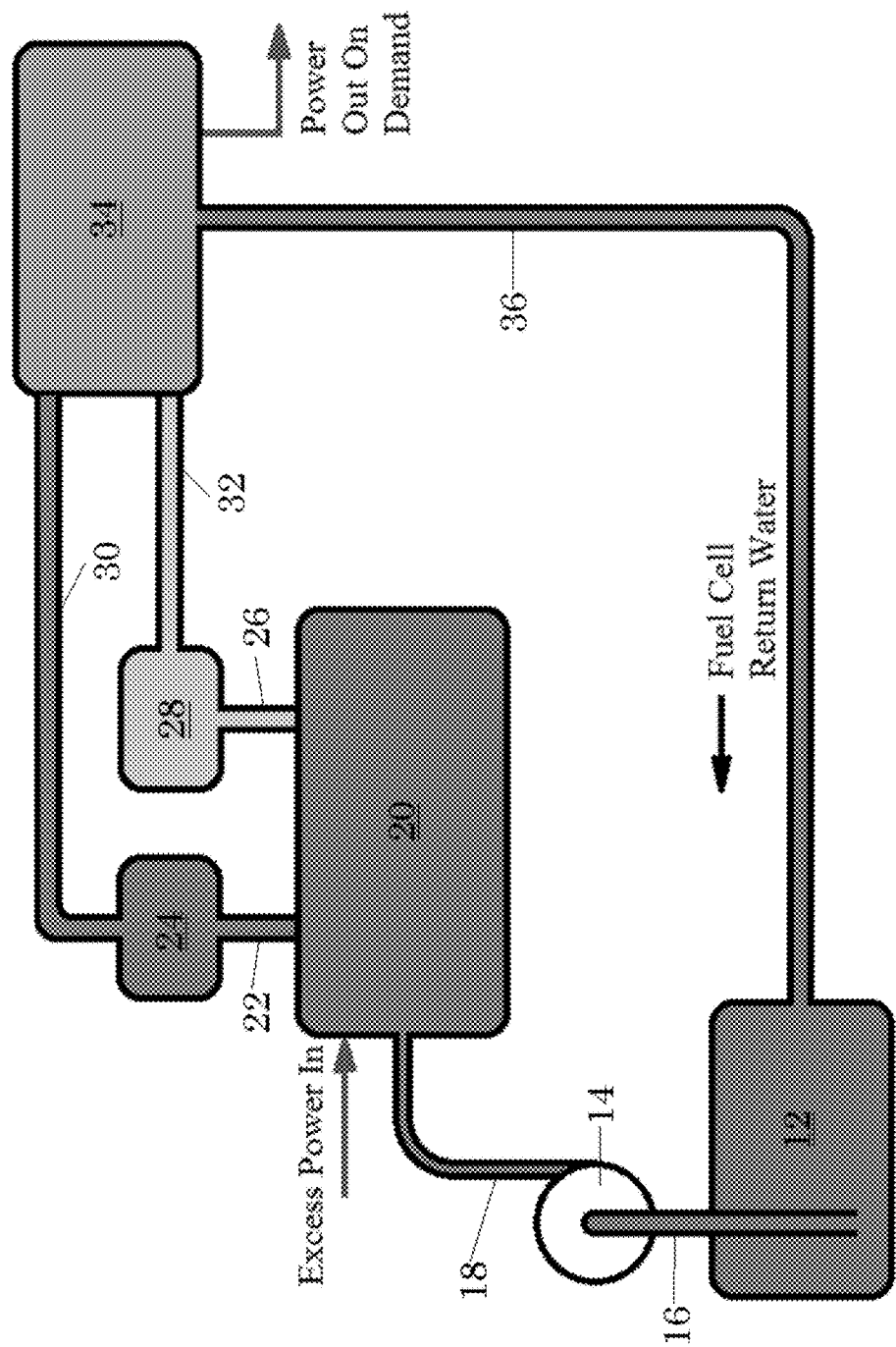

SYSTEM AND METHOD FOR STORAGE AND RETRIEVAL OF ENERGY

RELATED APPLICATIONS

Not applicable.

BACKGROUND AND FIELD

1. Field

The present device relates generally to methods for energy storage, and more specifically to a method for storage and retrieval of energy utilizing electrolysis and fuel cell technology.

2. Background

As new technologies are developed, particularly in the area of renewable energy and renewable energy-powered devices, new methods of storing and retrieving energy are needed. Advances in batteries, and specifically with respect to lithium ion batteries, have been promising, however drawbacks remain. Intercalation causes degradation of lithium ion batteries during charge/discharge cycles. Further, the chemistry of a lithium ion battery places inherent limits on the energy density that can be achieved despite advances in technology. Replacements for lithium have been utilized, and research continues into improvements in lithium ion and related batteries. New and efficient methods of energy storage and retrieval are nonetheless needed.

SUMMARY

The present disclosure provides a method for storage and retrieval of energy. Energy is stored by performing electrolysis of water and directing the resulting hydrogen gas and oxygen gas to respective storage tanks. Energy is retrieved by directing hydrogen gas and oxygen gas from the storage tanks to a fuel cell where the hydrogen and oxygen are reacted to produce electricity and water. Water from the fuel cell is directed to a reservoir for subsequent electrolysis.

In one aspect of the present method, the water electrolyzed to produce hydrogen gas and oxygen gas may be provided at high pressure.

In another aspect of the present method, a pump may draw water from the reservoir and force the water into an electrolysis vessel at high pressure.

Another aspect of the present disclosure provides a system for storage and retrieval of energy. The system includes a water reservoir, an electrolyzer in fluid communication with the water reservoir, and a pump operable to draw water from the water reservoir and direct the water into the electrolyzer. A first storage vessel is provided in fluid communication with the electrolyzer, and receives and stores oxygen gas therefrom. A second storage vessel is provided in fluid communication with the electrolyzer and receives and stored hydrogen gas therefrom. A fuel cell is in fluid communication with both the first and second storage vessels.

In another aspect of the present disclosure, the fuel cell of the system is in fluid communication with the water reservoir, and water produced by the fuel cell is directed into the water reservoir.

In another aspect of the present disclosure, the pump of the system is configured to direct water into the electrolyzer at high pressure.

BRIEF DESCRIPTION OF THE DRAWINGS

FIG. 1 provides a schematic of a cyclical embodiment of a system of the present disclosure.

DETAILED DESCRIPTION

The present system allows for storage and retrieval of energy via efficient conversion between water and its components elements, hydrogen and oxygen. The system disclosed herein is capable of operation over a wide range of operating conditions and is preferably able to store a full day's worth of excess electricity production capacity for any given use to which an implementation is dedicated.

The present system and method include an energy storage step or component, and an energy retrieval step or component. The energy retrieval step or component may also be referred to herein as an energy production step or component.

Energy storage is performed by electrolysis of water within a electrolysis vessel. It is preferred that the water be compressed prior to electrolysis for efficiency purposes. The process of electrolysis causes the water to decompose into hydrogen gas and oxygen gas. The hydrogen gas resulting from the electrolysis flows along a conduit to a storage vessel, where the hydrogen gas is retained until it is required for the energy retrieval step or component of the present system or method. Oxygen gas is likewise directed along a conduit to a separate storage vessel, where it is also stored until needed for energy retrieval.

Energy retrieval or production is performed by directing hydrogen gas and oxygen gas from their respective storage vessels into a fuel cell. The hydrogen and oxygen gases are reacted within the fuel cell to produce electricity and water. It is preferred that the water is directed back to a reservoir that initially provides the water for electrolysis, and that the water is stored there for use in a subsequent electrolysis step.

A hypothetical system according to the present disclosure is now described. For purposes of this hypothetical, it is assumed that the system must meet an energy storage requirement of 118 kWh/day.

Net energy retrieved by the present system may be represented by the following expression:

$$(\text{Energy In} - \text{Pumping Energy}) * \eta_E * \eta_{FC}$$

where $\eta_E$=electrolyzer efficiency and $\eta_{FC}$=fuel cell efficiency. The system efficiency can therefore be expressed as the ratio of energy retrieved to energy in, as follows:

$$\eta_{System} = \left(1 - \frac{E_p}{E_{in}}\right) * \eta_E * \eta_{FC}$$

where $E_p$=pumping energy and $E_{in}$=energy in.

Storage pressure of water within the system is preferably 500 psi (3.45e6 Pa). The pumping power required to raise water pressure within the system from atmospheric pressure to storage pressure at 25° C. is 3356 J/kg water. Assuming 32.3 kg of water are electrolyzed on a daily basis, the daily energy requirement for pumping is equal to 108.3 kJ. The daily energy required for electrolysis of 32.3 kg of water is equal to 425,000 kJ. The pumping power therefore represents approximately 0.025% of the total energy requirement of the system. This is negligible for purposes of this hypothetical and will be disregarded.

Given an average mass flow rate of 32.3 kg per 14 hours (6.41e-4 kg/s), the power required to pressurize the water is equal to 3.356 kJ/kg*9.13e-4 kg/s, which is equal to 2.06 W or 0.003 hp.

Commercially available electrolyzers range in efficiency from at least 80% up to around 95%. Fuel cell efficiency ranges from at least 50% up to around 85%.

Given that the pumping energy required by the present system is small, as noted above, the expression for system efficiency can be simplified to:

$$\eta_{System} = \eta_E * \eta_{FC}$$

Given the upper limits for fuel cell and electrolyzer efficiencies, above, it is assumed for purposes of this hypothetical that electrolyzer efficiency is 95% and fuel cell efficiency is 85%. Thus the overall system efficiency, $\eta_{System}$, is 81%. It is contemplated, however, that higher efficiencies may be possible through design optimization.

Temperature and pressure may also affect the efficiency of the present system. As a general matter, efficiency of an electrolyzer decreases with increasing pressure and increases with increasing temperature. With respect to fuel cells, increases in temperature tend, generally, to result in decreasing efficiency.

Achieving the expected energy storage and output requires mass storage for use in the present system. Given that the energy required to electrolyze water on a daily basis is 237.13 kJ/mole=13,159.3 kJ/kg=3.66 kWh/kg, and an estimated daily energy input to be stored of 118 kWh/day, the mass of water required to store the daily energy input is $$32.28 \text{ kg/day} = \frac{118 \text{ kWh/day}}{3.66 \text{ kWh/kg}}.$$

The daily mass of hydrogen to be stored is $$3.62 \text{ kg-H}_2/\text{day} = 32.28 \text{ kg} - \frac{\text{water}}{\text{day}} * \frac{2.018 \text{ kg-H}_2}{18.02 \text{ kg-water}}.$$

The daily mass of oxygen to be stored is $$28.67 \text{ kg-O}_2/\text{day} = 32.28 \text{ kg} - \frac{\text{water}}{\text{day}} * \frac{16.0 \text{ kg-O}_2}{18.02 \text{ kg-water}}.$$

Volume storage requirements must also be determined. Assuming the ideal gas equation of state, wherein $pv=RT \rightarrow v=RT/p$, where v=gas specific volume (m$^3$/kg), R=the gas constant for each constituent (4.10 kJ/kg-K for hydrogen and 0.260 kJ/kg-K for oxygen), T=298 K, and p=3450 kPa (500 psi), the storage volume of gases is V=mv=0.0013 m$^3$ for hydrogen and V=mv=0.0006 m$^3$ for oxygen. These volumes are accommodated by commercially-available high-pressure cylinders.

Given the above parameters of the hypothetical, overall system efficiency is estimated at approximately 80%. Storage requirements are modest, and commercially-available storage cylinders provide a low-cost means for storing the hydrogen and oxygen gas.

Turning now to the drawing, wherein like numerals indicate like parts, FIG. 1 provides a schematic of one, cyclical embodiment of a system 10 according to the present disclosure. Although the system is cyclical, for purposes of describing this exemplary embodiment, this text will begin with low-pressure reservoir 12, in which water is stored prior to electrolysis. A pump 14 is provided in fluid communication with low-pressure reservoir 12 and operable to draw water from low-pressure reservoir 12 along a first conduit 16, and to force the water along a second conduit 18 into an electrolysis vessel 20 (also referred to herein as an electrolyzer). Electrolyzer 20 utilizes power to cause decomposition of the water therein into its constituents—hydrogen gas and oxygen gas. Oxygen gas is directed from the electrolyzer 20 along a conduit 22 into a first storage vessel 24. Hydrogen gas is directed from electrolyzer 20 along a conduit 26 into a second storage vessel 28. The storage vessels may be compressed gas cylinders, although any suitable storage structures may be utilized.

When energy production is required, oxygen gas is directed from first storage vessel 24 along conduit 30 into fuel cell 34. Likewise, hydrogen gas is directed from second storage vessel 28 along a conduit 32 into fuel cell 34. The oxygen gas and hydrogen gas are reacted within the fuel cell to produce electricity and water. The electricity is directed away from the fuel cell and used to perform work or, potentially, to be directed to an electrical grid. The water produced by fuel cell 34 is preferably directed along conduit 36 to low-pressure reservoir 12.

The various features and embodiments of the present device disclosed above are illustrative of the present disclosure and are meant to be exemplary. Various modifications or alterations to what is disclosed herein may be readily apparent to those of skill in the art upon reading this disclosure, and it is contemplated that such modifications or alterations remain within the spirit, and scope, of the present invention.

Having thus described the preferred embodiment of the invention, what is claimed as new and desired to be protected by Letters Patent includes the following:

1. A method for storage and retrieval of energy comprising the steps of:
   (a) storing energy by:
      (i) performing electrolysis of water within a electrolysis vessel such that the water decomposes into hydrogen gas and oxygen gas;
      (ii) directing the hydrogen gas through a first conduit and into a first storage vessel for storage therein; and
      (iii) directing the oxygen gas through a second conduit and into a second storage vessel for storage therein;
   (b) retrieving energy by:
      (i) directing said hydrogen gas from said first storage vessel along a third conduit into a fuel cell;
      (ii) directing said oxygen gas from said second storage vessel along a fourth conduit into said fuel cell; and
      (iii) reacting the hydrogen gas and oxygen gas within the fuel cell to produce electricity and water,
   and
   (c) directing water from said fuel cell to a reservoir for subsequent electrolysis as in step a), above,
   wherein the electrolysis vessel, first storage vessel, second storage vessel, fuel cell, and reservoir form a closed loop.

2. The method according to claim 1, wherein the water electrolyzed in step (a)(i) is provided at high pressure.

3. The method according to claim 1, wherein the water electrolyzed in step (a)(i) is directed from said reservoir to said electrolysis vessel along a fifth conduit.

4. The method according to claim 3, wherein a pump associated with said fifth conduit draws water from said reservoir and forces the water into said electrolysis vessel at high pressure.

5. A system for storage and retrieval of energy comprising:
- a water reservoir;
- an electrolyzer in fluid communication with said water reservoir;
- a pump operable to draw water from said water reservoir and to direct said water into said electrolyzer;
- a first storage vessel in fluid communication with said electrolyzer and configured to receive oxygen gas therefrom;
- a second storage vessel in fluid communication with said electrolyzer and configured to receive hydrogen gas therefrom;
- a fuel cell in fluid communication with said first storage vessel and said second storage vessel, wherein the water reservoir, electrolyzer, first storage vessel, second storage vessel, and fuel cell form a closed loop.

6. The system according to claim 5, wherein said fuel cell is in fluid communication with said water reservoir, and further wherein water produced by said fuel cell during operation thereof is directed to said water reservoir.

7. The system according to claim 5, wherein said pump is configured to direct water into said electrolyzer at high pressure.

* * * * *